US012528288B2

(12) United States Patent
Maeda

(10) Patent No.: US 12,528,288 B2
(45) Date of Patent: Jan. 20, 2026

(54) PRINTING DEVICE, PRINTING METHOD, AND NON-TRANSITORY COMPUTER-READABLE MEDIUM THEREFOR

(71) Applicant: BROTHER KOGYO KABUSHIKI KAISHA, Nagoya (JP)

(72) Inventor: Atsushi Maeda, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 178 days.

(21) Appl. No.: 18/474,334

(22) Filed: Sep. 26, 2023

(65) Prior Publication Data

US 2024/0109299 A1 Apr. 4, 2024

(30) Foreign Application Priority Data

Sep. 30, 2022 (JP) ................................ 2022-158288

(51) Int. Cl.
*B41J 2/045* (2006.01)

(52) U.S. Cl.
CPC ....... *B41J 2/04546* (2013.01); *B41J 2/04541* (2013.01); *B41J 2/04581* (2013.01); *B41J 2/04588* (2013.01)

(58) Field of Classification Search
CPC ................ B41J 2/04546; B41J 2/04541; B41J 2/04581; B41J 2/04588
See application file for complete search history.

(56) References Cited

U.S. PATENT DOCUMENTS 9,555,627 B2 * 1/2017 Sano .................... B41J 2/04541
2009/0207200 A1 * 8/2009 Tamura ................ B41J 2/04573
358/1.15

FOREIGN PATENT DOCUMENTS

JP S58-53784 Y2 12/1983
JP 2001-54947 A 2/2001
JP 2010-64465 A 3/2010
JP 2010-142978 A 7/2010
JP 2010-158876 A 7/2010

OTHER PUBLICATIONS

Notice of Reasons for Rejection dated Dec. 26, 2023 issued in the JP counterpart application No. 2022-158288 together with English language translation.

* cited by examiner

*Primary Examiner* — Leslie J Evanisko
*Assistant Examiner* — Thomas Ray Knief
(74) *Attorney, Agent, or Firm* — Scully, Scott, Murpjy & Presser, P.C.

(57) ABSTRACT

A printing device includes a nozzle, a multiplexing part configured to generate a time-division multiplexed signal based on first data indicating a first driving waveform and second data indicating a second driving waveform, different from the first driving waveform, and a separator configured to separate a first driving waveform signal indicating the first driving waveform or a second driving waveform signal indicating the second drive waveform from the time-division multiplexed signal. The energy generating element is driven based on the separated first driving waveform signal or the separated second driving waveform signal.

9 Claims, 10 Drawing Sheets

DRIVING WAVEFORM A1

DRIVING WAVEFORM B1

DRIVING WAVEFORM C1

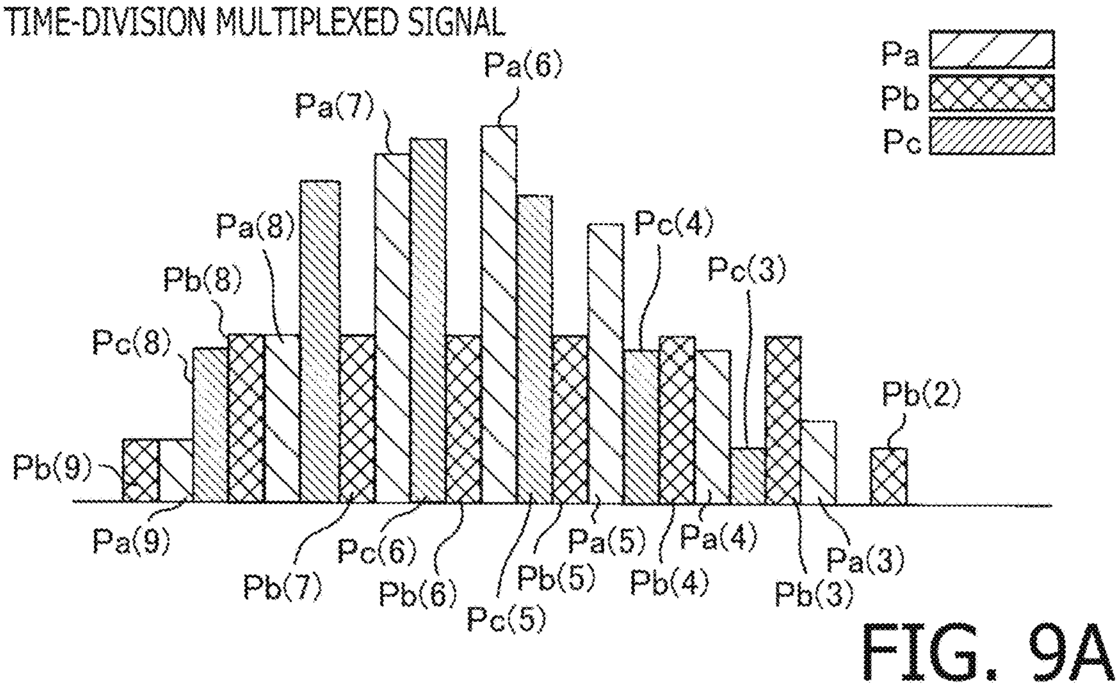
FIG. 9A
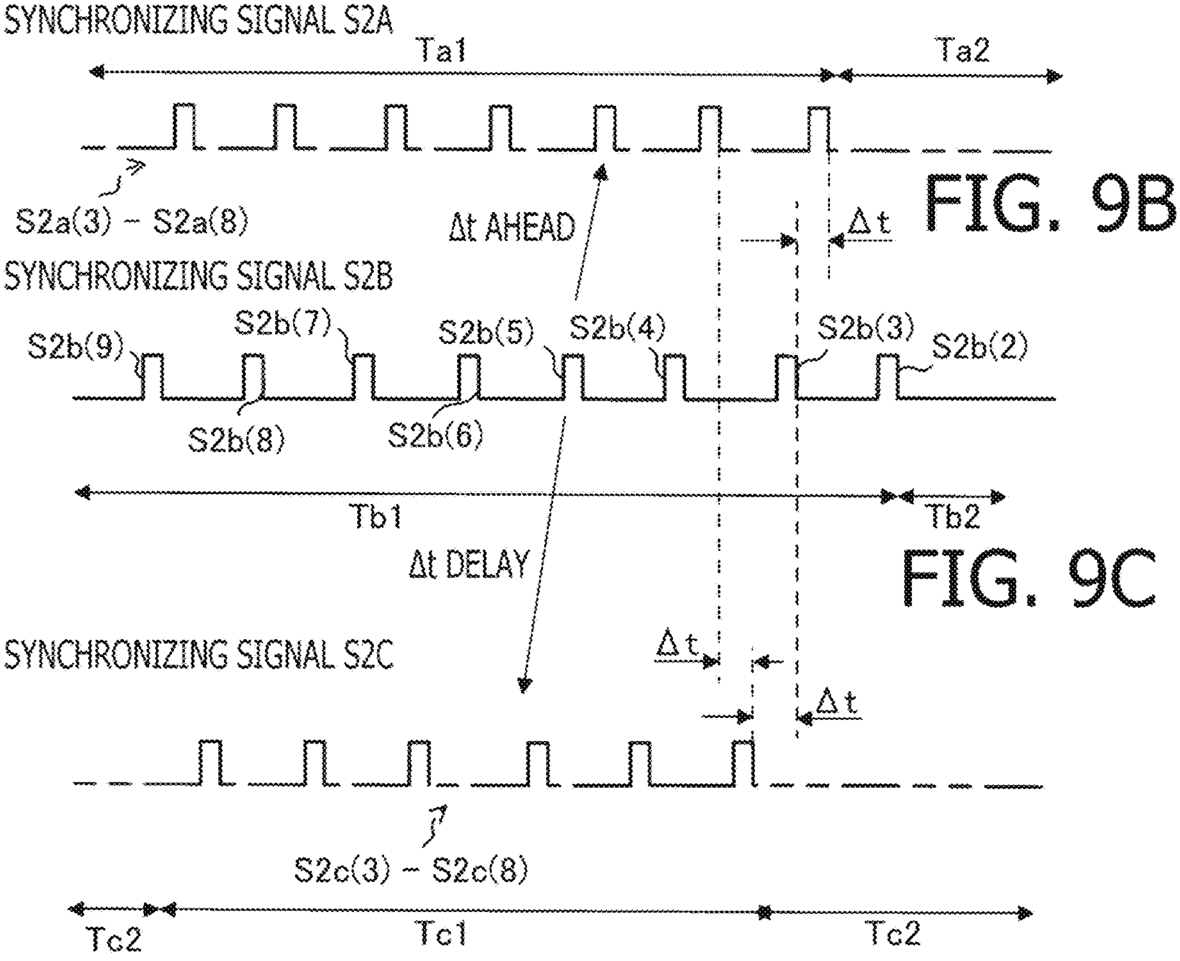
FIG. 9B
FIG. 9C
FIG. 9D

PRINTING DEVICE, PRINTING METHOD, AND NON-TRANSITORY COMPUTER-READABLE MEDIUM THEREFOR

REFERENCE TO RELATED APPLICATIONS

This application claims priority from Japanese Patent Application No. 2022-158288 filed on Sep. 30, 2022. The entire content of the priority application is incorporated herein by reference.

BACKGROUND ART

The present disclosure relates to a printing device configured to eject liquid, a printing method, and a non-transitory computer-readable device containing compute-executable instructions to realize the method.

There are printers configured to generate first to fourth drive pulses with different amplitudes as drive signals to drive the piezoelectric elements of respective nozzles. During one cycle of printing one pixel, the first to fourth drive pulses are continuously generated. One of the first to fourth drive pulses is selected and applied to the piezo element of each nozzle. Each nozzle ejects an amount of ink corresponding to the amplitude of the selected drive pulse, forming a dot of the desired size.

DESCRIPTION

According to the conventional art described above, although four drive pulses are continuously generated during one cycle, only one drive pulse is selected. This means that the time allocated to the three drive pulses that were not selected is a waiting time for the nozzle.

According to aspects of the present disclosure, there is provided a printing device comprising an energy generating element, a multiplexing part configured to generate a time-division multiplexed signal based on at least first data indicating a first driving waveform and second data indicating a second driving waveform different from the first driving waveform, the first data and the second data being transmittable via the time-division multiplexed signal through a single signal line, the time-division multiplexed signal including a first part of the first driving waveform, a second part of the first driving waveform, a third part of the second driving waveform and a fourth part of the second driving waveform, the third part being arranged between the first part and the second part, the second part being arranged between the third part and the fourth part, and a separator configured to separate, based on a synchronizing signal, one of a first driving waveform signal indicating the first driving waveform and a second driving waveform signal indicating the second drive waveform from the time-division multiplexed signal input to the separator. The first driving waveform signal includes a first signal and a second signal, an amplitude of the first signal being greater than or equal to a particular value, an amplitude of the second signal being less than the particular value. The printing device is configured to generate the synchronizing signal in such a manner that the synchronizing signal is in a first state during a first period when the first signal is present, and is in a second state different from the first state during at least part of a second period when the second signal is present, the first signal being separable when the synchronizing signal is in the first state, the first signal being not separable when the synchronizing signal is in the second state, and drive the energy generating element based on one of the first driving waveform signal and the second driving waveform signal, whereby liquid is ejected through a nozzle.

Further, according to aspects of the present disclosure, there is provided a printing method for printing by ejecting liquid from a nozzle by using an energy generating element. The printing method includes generating a time-division multiplexed signal based on first data indicating a first driving waveform and second data indicating a second driving waveform different from the first driving waveform, the first data and the second data being transmittable via the time-division multiplexed signal through a single signal line, the time-division multiplexed signal including a first part of the first driving waveform, a second part of the first driving waveform, a third part of the second driving waveform and a fourth part of the second driving waveform, the third part being arranged between the first part and the second part, the second part being arranged between the third part and the fourth part, and separating one of a first driving waveform signal indicating the first driving waveform and a second driving waveform signal indicating the second drive waveform from the time-division multiplexed signal based on a synchronizing signal. The first driving waveform signal includes a first signal and a second signal, an amplitude of the first signal being greater than or equal to a particular value, an amplitude of the second signal being less than the particular value. The printing method further comprises generating the synchronizing signal in such a manner that the synchronizing signal is in a first state during a first period when the first signal is present, and is in a second state different from the first state during at least part of a second period when the second signal is present, the first signal being separable when the synchronizing signal is in the first state, the first signal being not separable when the synchronizing signal is in the second state, and driving the energy generating element based on one of the separated first driving waveform signal and the separated second driving waveform signal, whereby liquid is ejected through the nozzle.

Additionally, according to aspects of the present disclosure, there is provided a non-transitory computer-readable recording medium for a printing device configured to print by ejecting liquid from a nozzle by using an energy generating element. The recording medium containing computer-executable instructions which cause, when executed by a controller of the printing device, the printing device to perform generating a time-division multiplexed signal based on first data indicating a first driving waveform and second data indicating a second driving waveform different from the first driving waveform, the first data and the second data being transmittable via the time-division multiplexed signal through a single signal line, the time-division multiplexed signal including a first part of the first driving waveform, a second part of the first driving waveform, a third part of the second driving waveform and a fourth part of the second driving waveform, the third part being arranged between the first part and the second part, the second part being arranged between the third part and the fourth part, and separating one of a first driving waveform signal indicating the first driving waveform and a second driving waveform signal indicating the second drive waveform from the time-division multiplexed signal based on a synchronizing signal. The first driving waveform signal includes a first signal and a second signal, an amplitude of the first signal being greater than or equal to a particular value, an amplitude of the second signal being less than the particular value. The instructions further cause, when executed by the controller, the printing device to perform generating the synchronizing signal in such a manner that the synchronizing signal is in a first during a first period when the first signal is present, and is in a second state different from the first state during at least part of a second period when the second signal is present, the first signal being separable when the synchronizing signal is in the first state, the first signal being not separable when the synchronizing signal is in the second state, and driving the energy generating element based on one of the separated first driving waveform signal and the separated second driving waveform signal.

FIGS. 9A, 9B, 9C and 9D illustrate a relationship among the time-division multiplexed signal and synchronizing signals.

Figure 1:
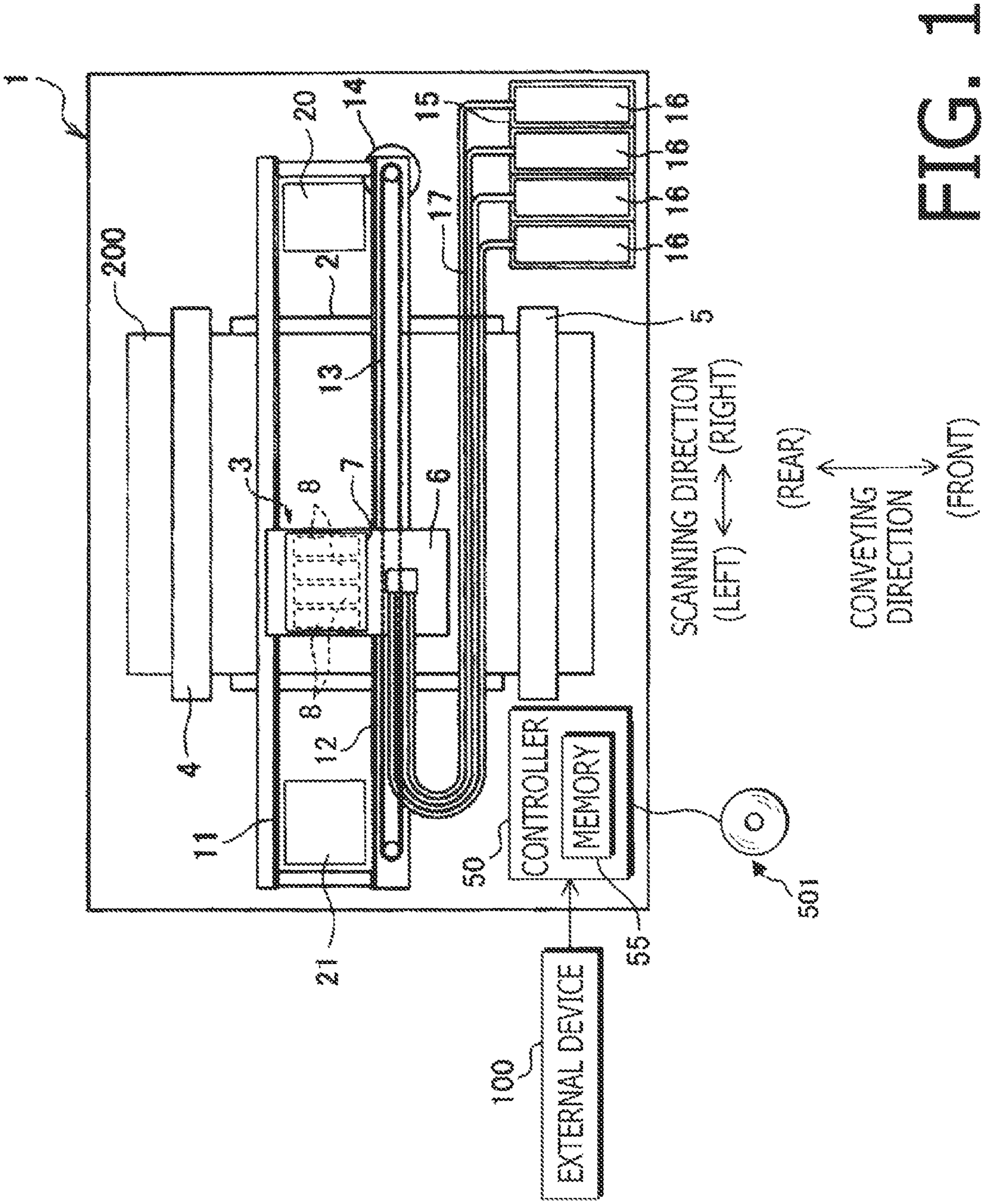
FIG. 1 is a plan view of a printing device according to an embodiment of the present disclosure.

Hereinafter, a printing device 1 according to an embodiment of the present disclosure will be described with reference to the drawings. FIG. 1 is a plan view schematically shows the printing device 1. In the following description, directions as shown in FIG. 1 will be referred to for indicating directions (i.e., front, rear, right and left directions). The front-rear direction corresponds to a sheet feed direction, and the right-left direction corresponds to a scanning direction. Further, a closer direction with respect to the plane of FIG. 1 corresponds to an up side of the printing device 1, and a farther side with respect to the plane of FIG. 1 corresponds to a bottom side of the printing device 1.

As shown in FIG. 1, the printing device 1 has a platen 2, an ink ejection device 3, and conveying rollers 4 and 5. On an upper surface of the platen 2, printing sheet 200, which is a printing medium, is placed. The ink ejection device 3 ejects the ink (i.e., ink droplets) on the printing sheet 200 placed on the platen 2 to print an image. The ink ejection device 3 has a carriage 6, a sub tank 7, four inkjet heads 8, and a circulation pump not shown.

On the upper side of the platen 2, two guide rails 11 and 12 extending in the right-left direction are provided to guide the carriage 6. The carriage 6 is connected with an endless belt 13 that extends in the right-left direction. The endless belt 13 is driven, by the carriage driving motor 14, to move. As the endless belt 13 moves, the carriage 6 is guided by the guide rails 11 and 12, and is moved reciprocally in the scanning direction within an area facing the platen. More concretely, with supporting the four inkjet heads 8, the carriage 6 performs a first movement to move the inkjet head 8, in the scanning direction, from left to right, from a certain position to another position, and a second movement to move the inkjet head 8, in the scanning direction, from right to left, from a certain position to another position.

Between the guide rails 11 and 12, a cap 20 and flushing receiver 21 are provided. The cap 20 and the flushing receiver 21 are arranged on a lower side with respect to the ink ejection device 3. The cap 20 are arranged on a right end part of the guide rails 11 and 12, while the flushing receiver 21 is arranged on a left end part of the guide rails 11 and 12. It is noted that the cap 20 and flushing receiver 21 may be arranged reversely on the left and right.

The sub tank 7 and the four inkjet heads 8 are mounted on the carriage 6, and are moved, together with the carriage 6, reciprocally in the scanning direction. The sub tank 7 is connected to a cartridge holder 15 via a tube 17. To the cartridge holder 15, ink cartridges 16 of one or multiple colors (four colors, in the present embodiment) are mounted. The four colors are, for example, black, yellow, cyan, and magenta.

Inside the sub tank 7, for ink chambers are formed. In the four ink chambers, four colors of ink supplied by the four ink cartridges 16 are reserved, respectively.

The four inkjet heads 8 are arranged below the sub tank 7 in the scanning direction. On a lower surface of each inkjet head 8, multiple nozzles 80 (see FIG. 2) are formed. One inkjet head 8 corresponds to one color of ink and is connected to one ink chamber. In other words, the four inkjet heads 8 correspond to four colors of ink and are connected to the four ink chambers, respectively.

Each inkjet head 8 is provided with an ink inlet and an ink outlet. The ink inlet and the ink outlet are connected to the corresponding ink chamber via tubes. Between each ink inlet and the corresponding ink chamber, a circulation pump is interposed.

The ink sent from the ink chamber by the circulation pump flows into the inkjet heads 8 through the ink inlet and is ejected from the nozzles 80. The ink that is not ejected from the nozzles 80 returns to the inkjet head 8 through the ink inlet. The ink circulates between the ink chambers and the inkjet heads 8. The four inkjet heads 8 eject the four colors of ink toward the printing sheet 200 supplied from the sub tank 7, moving together with the carriage 6 in the scanning direction.

As shown in FIG. 1, the conveying roller 4 is arranged on an upstream side (i.e., the rear side), in the conveying direction, with respect to the platen 2. The conveying roller 5 is arranged on a downstream side (i.e., the front side), in the conveying direction, with respect to the platen 2. The two conveying rollers 4 and 5 are driven by a motor in a synchronized manner. The two conveying rollers 4 and 5 convey the printing sheet 200 placed on the platen 2 in the conveying direction that is orthogonal to the scanning direction. The printing device 1 has a controller 50.

The controller 50 include a CPU or a logic circuit (e.g., FPGA), a memory 55 such as non-volatile memory and RAM, and the like. The memory 55 stores a computer program that controls the operation of the printing device 1. The computer program may be stored in the memory 55 in advance when the printing device 1 is shipped, may be installed in the memory 55 from a portable storage medium 501, such as an optical disc or flash memory, or may be installed in the memory 55 over a network. The controller 50 receives print jobs and driving waveform data from an external device 100 and stores them in the memory 55. The controller 50 executes the print jobs in accordance with the computer program. That is, the controller 50 controls the driving of the ink ejection device 3, the conveying roller 4, and the like, and executes a printing process.

Figure 2:
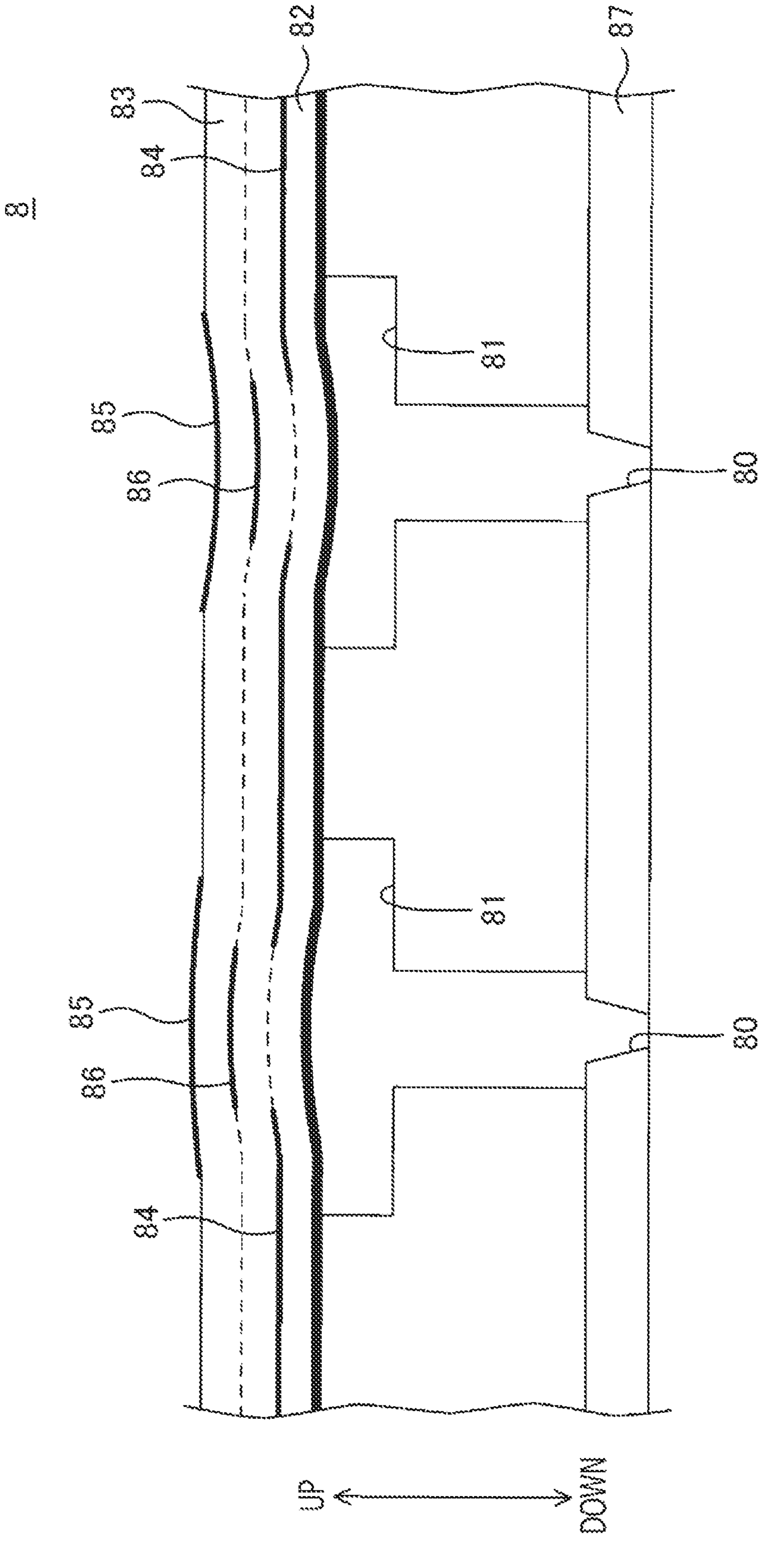
FIG. 2 is a partially enlarged cross-sectional view of an inkjet head.

FIG. 2 is a partially enlarged cross-sectional view of the inkjet head 8. The inkjet head 8 has multiple pressure chamber 81. The multiple pressure chambers 81 constitute multiple pressure chamber arrays. On an upper side with respect to each pressure chamber 81, a vibrating plate 82 is formed, and a layered piezoelectric body 83 is formed on an upper side with respect to the vibrating plate 82. On the upper side with respect to each pressure chamber 81, and between the piezoelectric body 83 and the vibrating plate 82, a first common electrode 84 is formed 84. The piezoelectric body 83 is an example of an energy generating element according to aspects of the present disclosure.

Inside the piezoelectric body 83, a second common electrode 86 is provided. The second common electrode 86 is arranged on an upper side with respect to each pressure chamber 81 and on an upper side with respect to the first common electrode 84. The common electrode 86 is arranged at a position that does not face the first common electrode 84. On an upper side of each pressure chamber 81, and on an upper surface of the piezoelectric body 83, an individual electrode 85 is formed. The individual electrode 85 is arranged opposite, in the up-down direction, to the first common electrode 84 and the second common electrode 86 with the piezoelectric body 83 sandwiched therebetween. The vibrating plate 82, the piezoelectric body 83, the first common electrode 84, the individual electrode 85 and the second common electrode 86 constitute an actuator 88.

On a lower part of each pressure chamber 81, a nozzle plate 87 is provided. On the nozzle plate 87, multiple nozzles 80, each of which penetrates through the nozzle plate 87 in the up-down direction, are formed. The nozzles 80 are arranged on the bottom surface of each pressure. The multiple nozzles constitute multiple nozzle arrays, each of which extends along the pressure chamber array.

The first common electrode 84 is connected to a COM terminal (in the present embodiment, the ground), and the second common electrode 86 is connected to a VCOM terminal. It is noted that a VCOM voltage is higher than a COM voltage. The individual electrode 85 is connected to a switch group 54 (see FIG. 3). The individual electrode 85 is applied with a High voltage or Low voltage, thereby the piezoelectric body 83 deforming to vibrate the vibrating plate 82. As the vibrating plate 82 vibrates, the ink is ejected from the pressure chamber 81 through the nozzles 80.

Figure 3:
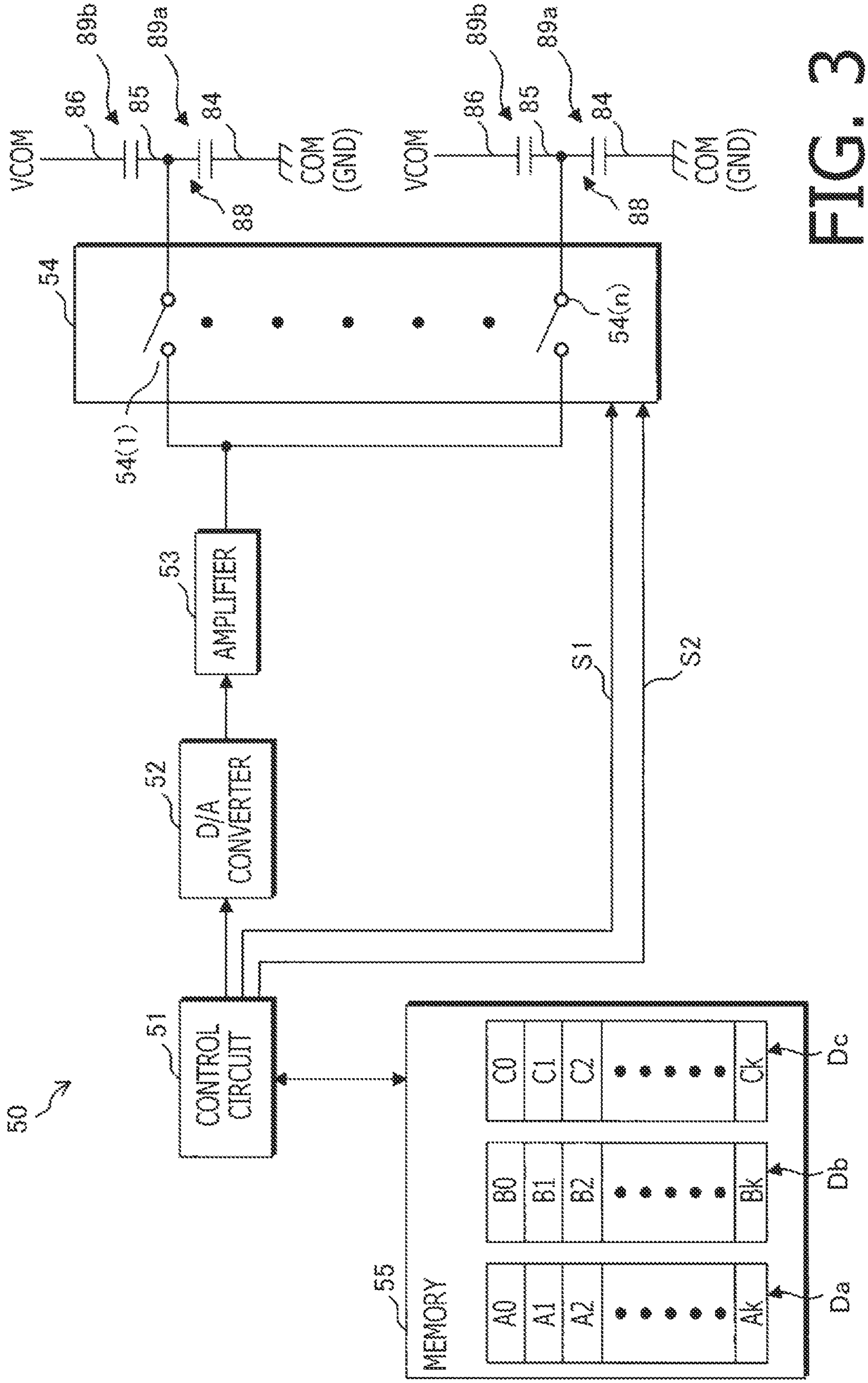
FIG. 3 is a block diagram of a controller of the printing device.

FIG. 3 is a block diagram of the controller 50. The controller 50 includes a control circuit 51, a D/A converter 52, an amplifier 53, a switch group 54 and a memory 55. The memory stores the driving waveform data. The driving waveform data is quantized data indicating a voltage waveform applied to the individual electrode 85, that is, data indicating the driving waveform to drive the actuator 88. In the present embodiment, driving waveform data Da, Db and Dc are stored in the memory 55.

The D/A converter 52 converts a digital signal to an analog signal. The amplifier 53 amplifies the analog signal. The switch group 54 includes multiple n-th switches 54(*n*), (n=1, 2, . . . ). The n-th switch 54(*n*) is configured by, for example, an analog switch IC. One ends of the multiple n-th switches 54(*n*) are connected to the amplifier 53 through a common bus. The other ends of the multiple n-th switches 54(*n*) are connected to respective individual electrode 85 corresponding to the multiple nozzles 80, respectively. That is, the n-th switch 54(*n*) is provided one for each actuator 88. The control circuit 51, the D/A converter 52, the amplifier 53 and the memory 55 function as a multiplexing part. The switch group 54 functions as a separator.

The individual electrode 85, the first common electrode 84 and the piezoelectric body 83 constitute a first condenser 89*a*. Further, the individual electrode 85, the second common electrode 86 and the piezoelectric body 83 constitute a second condenser 89*b*.

Figure 4A:
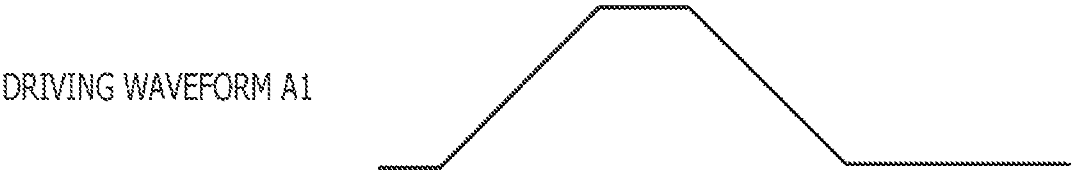
FIGS. 4A, 4B and 4C show examples of driving waveform.
Figure 4B:
Figure 4C:
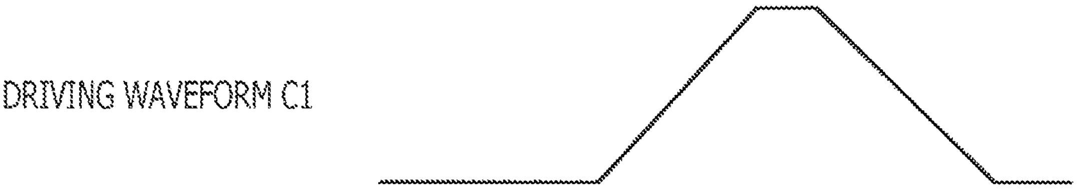

FIGS. 4A-4C show an example of driving waveforms A, B and C, respectively. The driving waveforms A, B and C deforms the piezoelectric body 83. As the piezoelectric body 83 is deformed, the vibrating plate 82 vibrates. Then, by the vibration of the vibrating plate 82, the ink in the pressure chamber 81 is caused to pass through a descender, and ejected through the nozzle 80. For example, the driving waveform A is for ejecting a large-size droplet, and the driving waveform B is for ejecting a medium-size droplet. The driving waveform C is also for ejecting a large-sized droplet, but the driving waveforms A and C have different ejection timings.

In each of FIGS. 4A-4C, a right-hand side part of the waveform represents a state earlier in time than a left-hand side part. The same applies to FIGS. 5A-5C, 6A-6D, 7A-7C, 9 and 10. The waveform data Da is the quantized data of the driving waveform A, the waveform data Db is the quantized data of the driving waveform B, and the waveform data Dc is the quantized data of the driving waveform C. The driving waveform data Da includes quantized data Ak (k=0, 1, 2, . . . ), the driving waveform data Db includes quantized data Bk (k=0, 1, 2, . . . ) and the driving waveform data Dc includes quantized waveform data Ck (k=0, 1, 2, . . . ).

Figure 5A:
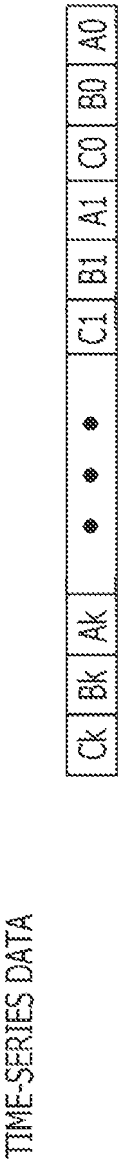
FIGS. 5A, 5B and 5C illustrate a data configuration of time-series data, an analog signal and a time-division multiplexed signal, respectively.
Figure 5B:
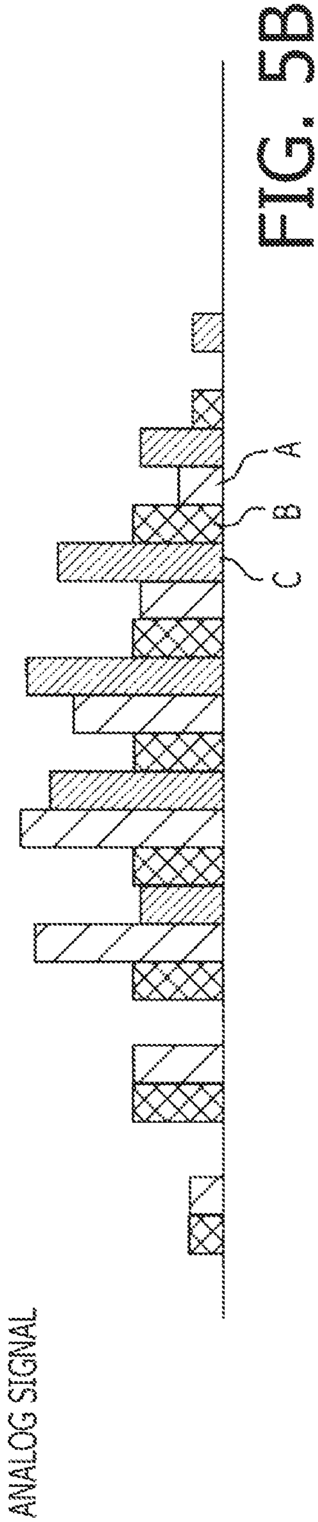
Figure 5C:
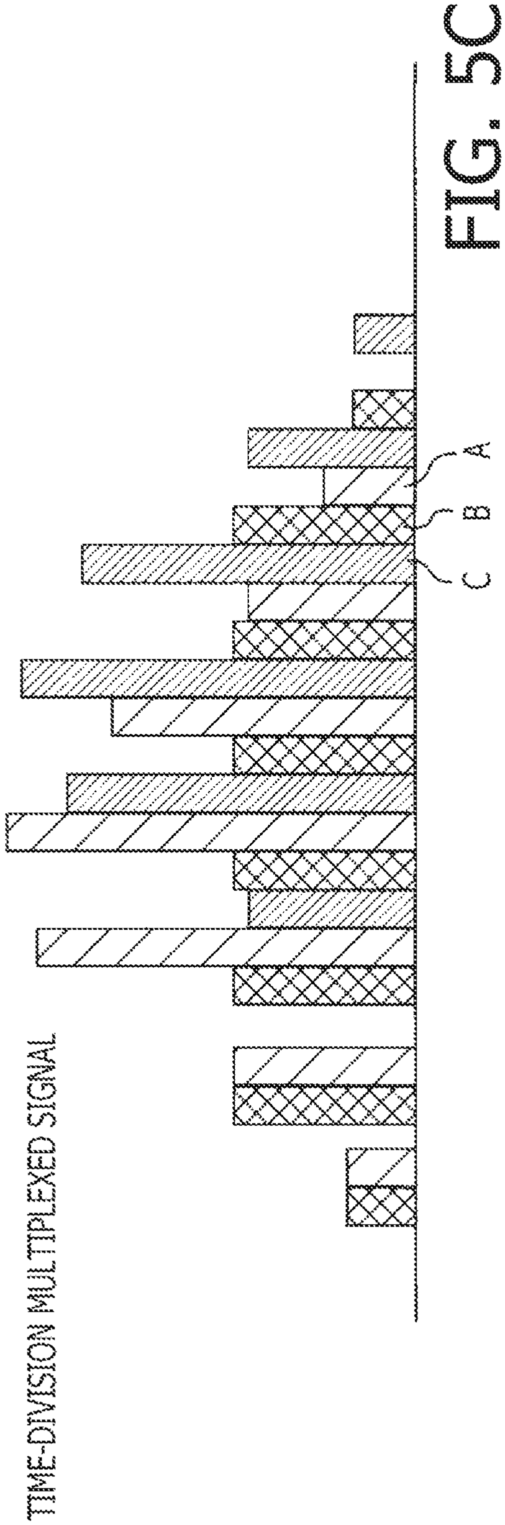

FIGS. 5A-5C show an example of time-series data, an analog signal and a time-division multiplexed signal. In FIGS. 5B and 5C, parts indicated by "A," "B," and "C" corresponds to the driving waveforms A, B and C, respectively. When driving the actuator 88, the control circuit 51 access the memory 55 to obtain the driving waveform data Da, Db and DC, and generates time-series data. The time-series data is data composed of data Ak, Bk, and Ck, arranged in order (i.e., A0, B0, C0, A1, B1, C1, . . . , Ak, Bk, Ck) with a time interval Δt. The time-series data is a digital signal. The time interval Δt is an inverse of a particular sampling frequency. The quantized data Ak, Bk, and Ck are arranged in the order A0, B0, C0, A1, B1, C1, . . . , Ak, Bk, Ck, at intervals of time corresponding to the inverse of the particular sampling frequency. In other words, the data length of the quantized data Ak, Bk, and Ck is less than or equal to the length corresponding to the inverse of the particular sampling frequency.

The quantized data A0 is continuous with the quantized data B0, the quantized data B0 is continuous with the quantized data C0, and the quantized data C0 is continuous with the quantized data A1. Therefore, there is no quantized data C0, other quantized data or other waveform data between the quantized data A0 and the quantized data B0. Further, there is no quantized data A0, other quantized data or other waveform data between the quantized data B0 and the quantized data C0. Furthermore, there is no quantized data B0, other quantized data or other waveform data between the quantized data C0 and the quantized data A1. It is noted that the sampling frequency is 24 MHz, and the data length of the quantized data Ak, Bk, and Ck is about 41 ns.

The control circuit 51 outputs the time-series data to the D/A converter 52. As shown in FIG. 5B, the D/A converter 52 converts the time-series data to an analog signal and outputs the analog signal to the amplifier 53. The amplifier 53 amplifies the input analog signal, and outputs the amplified signal to the switch group 54. As shown in FIG. 5C, the analog signal amplified by the amplifier 53 constitutes the time-division multiplexed signal.

In other words, the time-division multiplexed signal is not an analog signal corresponding only to data Ak, an analog signal corresponding only to data Bk, or an analog signal corresponding only to data Ck. Further, the time-division multiplexed signal is configured in such a manner that at least an analog signal corresponding to a group of three pieces of data including one piece of data Ak, one piece of data Bk, and one piece of data Ck, and an analog signal corresponding to a group of three pieces of data including one piece of data A(k+1), one piece of data B(k+1), and one piece of data C(k+1), and are consecutive in time series.

For example, in FIGS. 5A-5C, there is only one time-division multiplexed signal. In FIGS. 5A-5C, the analog signal corresponding to data C0 appears to be isolated. However, it is because an analog signal corresponding to a group of three pieces of data including data A0, data B0 and data C0, with data A0 and data B0 being zero, is consecutive in time series to an analog signal corresponding to a group of three pieces of data including data A1, data B1 and data C1, with data A1 being zero. Further, an analog signal corresponding to a group of data Ak and data Bk appears to be isolated. However, it is because an analog signal corresponding to a group of three pieces of data including data A(k−1), data B(k−1) and data C(k−1), with data C(k−1) being zero, is consecutive in time series to an analog signal corresponding to a group of three pieces of data including data Ak, data Bk and data Ck. For the same reason, an analog signal corresponding to a group of data A(k−1) and data B(k−1) appears to be isolated. Therefore, the analog signal shown in FIG. 5B is treated as one time-division multiplexed signal. With this configurations, multiple pieces of data corresponding to multiple waveforms, respectively, are transmittable via the time-division multiplexed signal through a single signal line.

In a time-division multiplexed signal, when the part corresponding to data Ak−1 is indicated as the first part, the part corresponding to data Ak is indicated as the second part, the part corresponding to data Bk−1 is indicated as the third part, and the part corresponding to data Bk is indicated as the fourth part, the third part is arranged between the first part and the second part, and the second part is arranged between the third part and the fourth part. In other words, the first and third parts are continuous, the third part and the second part are continuous, and the second part and the fourth part are continuous. That is, in the time-division multiplexed signal, there is no second part, fourth part, or other waveforms between the first and third parts.

In the time-division multiplexed signal, there is no first part, fourth part and other waveforms between the third part and the second part. Furthermore, in the time-division multiplexed signal, there is no first part, third part, or other waveforms between the second and fourth parts. There are similar relationships between data Ak and Ck, and there are similar relationships between data Bk and Ck. The control circuit 51, the D/A converter 52, the amplifier 53, and the memory 55 constitute a signal generator. One time-division multiplexed signal is contained within one ejection drive period. For example, when the ejection drive frequency (ejection frequency) is 100 kHz, one ejection drive period (ejection period) is 10 μs, and one time-division multiplexed signal is less than 10 us in length. It is preferable that there are at least three pieces of data Ak, three pieces of data Bk and three pieces of data Ck in a single time-division multiplexed signal. The reason will be described later.

The control circuit 51 outputs, to the switch group 54, a switch control signal S1 that controls the opening and closing of the multiple n-th switches 54(*n*), a synchronizing signal S2*a* corresponding to the driving waveform A, a synchronizing signal S2*b* corresponding to the driving waveform B, and a synchronizing signal S2*c* corresponding to the driving waveform C. The three synchronizing signals S2*a*, S2*b* and S2*c* will also be represented simply as synchronizing signals S2 (see FIG. 3). The switch control signal S1 includes first selection information indicating selection of one of the multiple n-th switches 54(*n*) and second selection information indicating selection of one of the three synchronizing signals S2*a*, S2*b* or S2*c*. The first and second selection information are associated with each other.

FIGS. 6A-6D illustrate a relationship between the time-division multiplex signals and the synchronizing signals S2*a*, S2*b* and S2*c*. The synchronizing signals S2*a*, S2*b* and S2*c* are pulse waves. A time interval Δt is provided between the rising edge of the pulse of the synchronizing signal S2*a* and the rising edge of the pulse of the synchronizing signal S2*b*. Further, a time interval Δt is provided between the rising edge of the pulse of synchronizing signal S2*b* and the rising edge of the pulse of synchronizing signal S2*c*, and the time interval Δt is provided between the rising edge of the pulse of synchronizing signal S2*c* and the rising edge of the pulse of synchronizing signal S2*a*. As mentioned above, the data Ak, Bk and Ck constituting the time-series data are arranged in sequence with the time interval Δt.

Therefore, when the control circuit 51 accesses the time-division multiplexed signal at the rising edge of the pulse of the synchronizing signal S2*a*, the control circuit 51 can obtain the driving waveform signal Pa, which corresponds to data Ak and indicates driving waveform A. When the control circuit 51 accesses the time-division multiplexed signal at the rising edge of the pulse of the synchronizing signal S2*b*, the control circuit 51 can obtain the driving waveform signal Pb, which corresponds to data Bk and indicates driving waveform B. When the control circuit 51 accesses the time-division multiplexed signal at the rising edge of the pulse of the synchronizing signal S2*c*, the control circuit 51 can obtain the driving waveform signal Pc, which corresponds to data Ck and indicates driving waveform C. In other words, one type of time-division multiplexed signal is input to one n-th switch 54(*n*), thereby one of the driving waveform signal Pa representing a driving waveform A, the driving waveform signal Pb representing a driving waveform B, and the driving waveform signal Pc representing a driving waveform C is separated from one type of time-division multiplexed signal.

The driving waveform signal Pa includes signals Pa(1) to Pa(9) aligned in time series. Each of the signals Pa (3) to Pa (9) is a first signal of which the amplitude of the voltage is greater than or equal to a particular value. Each of the signals Pa (1) and Pa (2) is a second signal of which the amplitude of the voltage is less than a particular value. The predetermined value is 0, 0.1, or 5 V, and the like. The first signal is a signal necessary to form the driving waveform to be input to the actuator 88. The second signal is a signal that is unnecessary to form the driving waveform to be input to the actuator 88. In FIGS. 6A-6D, only the first signals, namely the signals Pa (3) through Pa (9), are shown. A period during which the signals Pa (3) through Pa (9) are present constitutes a first period Ta1, while a period during which the signals Pa (1) and Pa (2) are present constitutes a second period Ta2 (see FIG. 6B).

It is noted that a period during which the signals Pa(n) (n=1, 2, . . . ) are present is a period in which three consecutive signals Pa (n), Pb (n) and Pc (n) are present as one unit. For example, a period during which the signal Pa(1) is present is a period during which the signals Pa(1), Pb(1), and Pc(1) are present, while a period during which the signals Pa(1) and Pa(2) are present is a period during which the signals Pa(1), Pb(1), Pc(1), Pa(2), Pb(2) and Pc(2) are present.

Figure 6A:
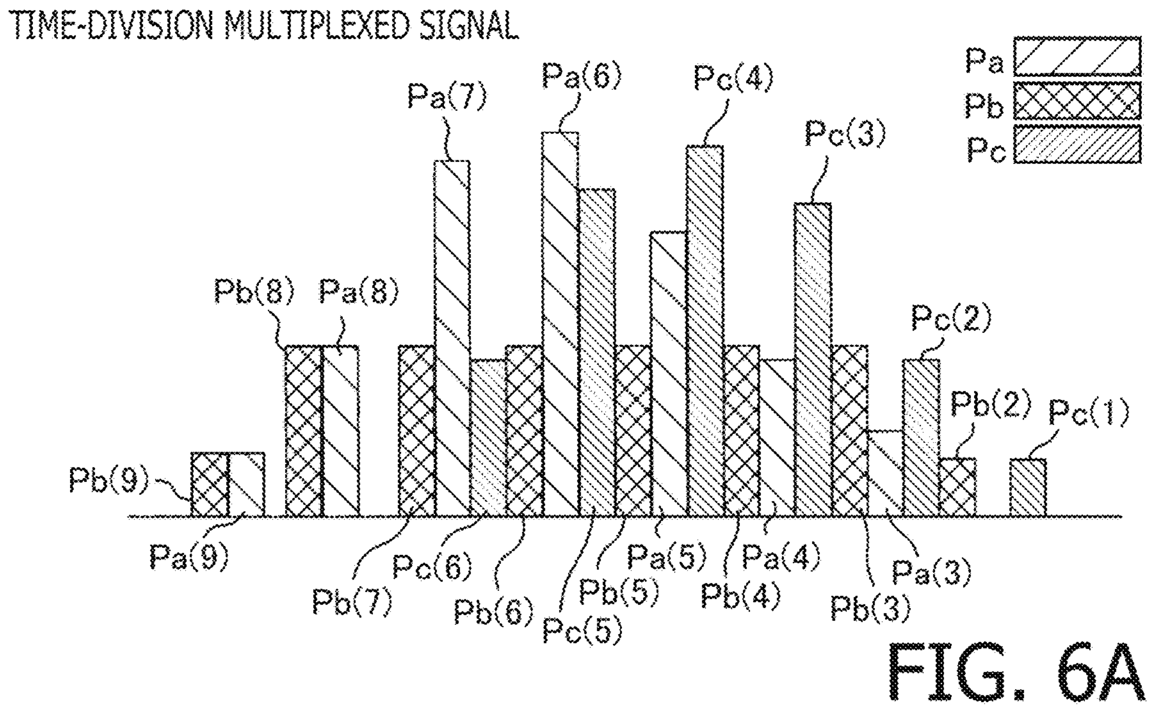
FIGS. 6A, 6B, 6C and 6D illustrate a relationship among the time-division multiplexed signal and synchronizing signals.

The driving waveform signal Pb includes signals Pb(1) to Pb(9) aligned in time series. The signals Pb(2) to Pb(9) are the first signals, and the signal Pb (1) is the second signal. Only the first signals, i.e., the signals Pb(2) through Pb(9), are indicated in FIG. 6A. A period during which the signals Pb(2) to Pb(9) are present constitutes the first period Tb1, while a period during which the signal Pb(1) is present constitutes the second period Tb2 (see FIG. 6C).

It is noted that a period during which the signals Pb(n) (n=1, 2, . . . ) is present is a period in which three consecutive signals Pa(n), Pb(n) and Pc(n) are present as a single unit. For example, a period during which the signal Pb(1) is present is a period during which the signals Pa(1), Pb(1), and Pc(1) are present, and a period during which the signals Pb(1) and Pb(2) are present is a period during which the signals Pa(1), Pb(1), Pc(1), Pa(2), Pb(2) and Pc(2) are present.

The driving waveform signal Pc includes signals Pc(1) to Pc(9) aligned in time series. The signals Pc(1) to Pc(6) are the first signals, while the signals Pc(7) to Pc(9) are the second signals. Only the first signals, namely, the signals Pc(1) through Pc(6), are indicated in FIG. 6A. A period during which the signals Pc(1) to Pc(6) are present constitutes a first period Tc1, while a period during which the signals Pc(7) to Pc(9) are present constitutes a second period Tc2 (see FIG. 6D).

A period during which the signals Pc(n) (n=1, 2, . . . ) is present is a period in which three consecutive signals Pa(n), Pb(n), and Pc(n) are present as a single unit. For example, the period during which the signal Pc(1) is present is the period during which the signals Pa(1), Pb(1) and Pc(1) are present, and the period during which the signals Pc(1) and Pc(2) are present is a period during which the signals Pa(1), Pb(1), Pc(1), Pa(2), Pb(2) and Pc(2) are present.

Figure 6B:
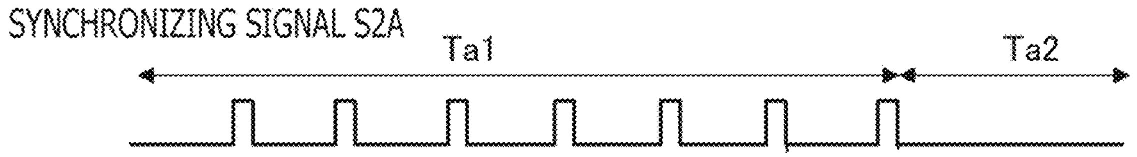

As shown in FIG. 6B, pulses of the synchronizing signal S2*a* are present during the first period Ta1, while no pulses of the synchronizing signal S2*a* are present during the second period Ta2. A state in which pulses are present is a first state in which the signals Pa(3) to Pa(9), i.e., the first signals, can be separated. A state in which no pulses are present is a second state in which the first signal is not separable.

Figure 6C:
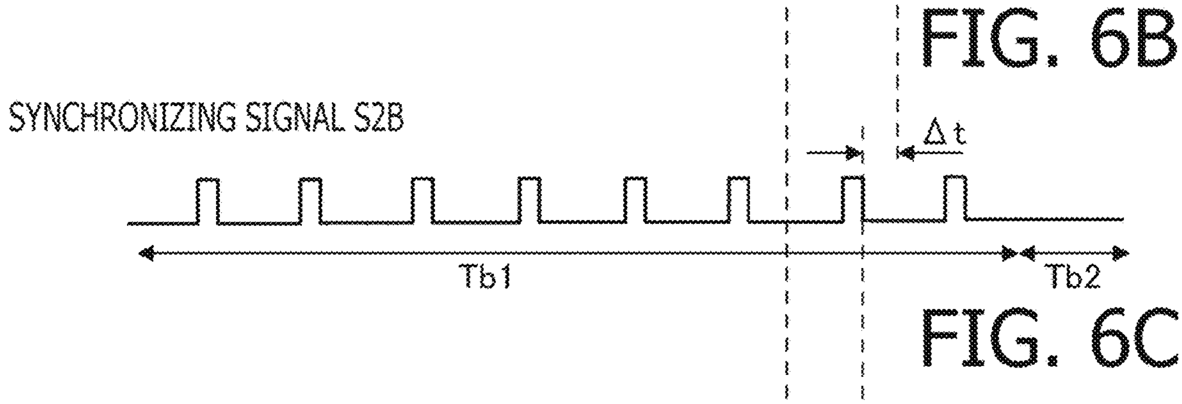

As shown in FIG. 6C, pulses of the synchronizing signal S2*b* are present during the first period Tb1, while no pulses of the synchronizing signal S2*b* are present during the second period Tb2. A state in which pulses are present is a first state in which the signals Pb(2) to Pb(9), i.e., the first signals, can be separated. A state in which no pulses are present is a second state in which the first signal is not separable.

Figure 6D:
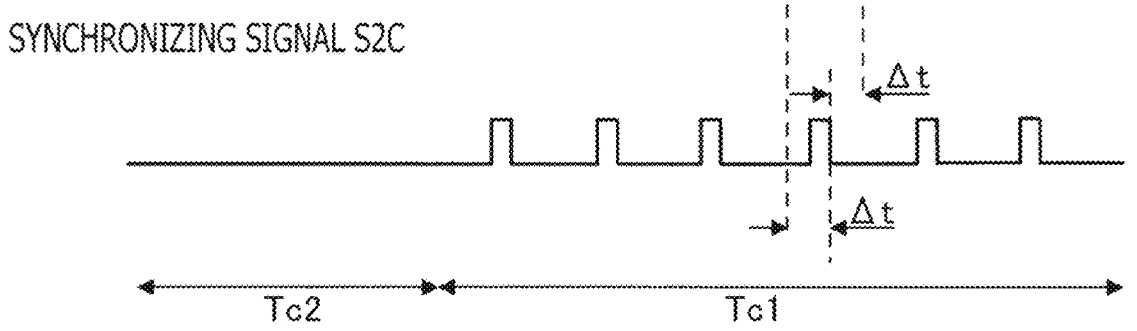

As shown in FIG. 6D, pulses of the synchronizing signal S2*c* are present during the first period Tc1, while no pulses of the synchronizing signal S2*c* are present during the second period Tc2. A state in which pulses are present is a first state in which the signals Pc(1) to Pc(6), i.e., the first signals, can be separated. A state in which no pulses are present is a second state in which the first signal is not separable.

That is, the control circuit 51 generates the synchronizing signals S2*a*, S2*b*, and S2*c* in such a manner that the synchronizing signals are in the first state in which the first signal can be separated during the first period in which at least the first signal is present, and, the synchronizing signals are in the second state different from the first state in which the first signal is not separable during at least a part of the second period in which the second signal is present. The control circuit 51 generates the synchronizing signals S2*a*, S2*b* and S2*c* based on the start and end points of the first period, i.e., the start and end points of the first signal.

Figure 7A:
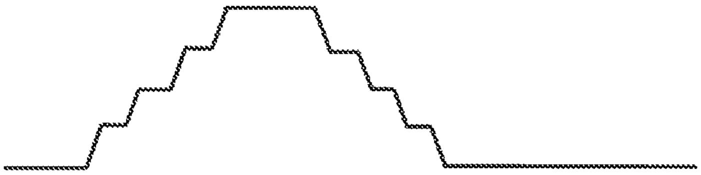
FIGS. 7A, 7B and 7C show examples of the driving waveform input to an actuator in accordance with opening/closing of an n-th switch.
Figure 7B:
Figure 7C:
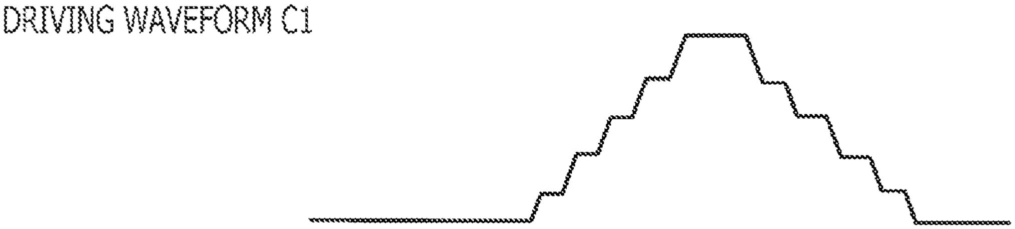

FIGS. 7A-7C show the driving waveforms input to the actuator 88 in accordance with the opening/closing of the n-th switch 54(*n*). When the synchronizing signal S2*a* is selected based on second selection information and the n-th switch 54(*n*) is selected based on first selection information, the switch group 54 closes the n-th switch 54(*n*) during a period where the pulse of the synchronizing signal S2*a* is in the high-level state, and opens the n-th switch 54(*n*) during a period where the pulse of the synchronizing signal S2*a* is in the low-level state. Electrical charge applied to the individual electrode 85 when the n-th switch 54(*n*) is closed is held by the first condenser 89*a* and the second condenser 89*b*, and the driving waveform A1 is input to the actuator 88 as shown in FIG. 7A. In other words, in accordance with the particular sampling frequency, the driving waveform signal Pa is separated from the time-division multiplexed signal, and the actuator 88 is driven by the driving waveform signal Pa. It is noted that, in order to represent a change (i.e., concavity and convexity) of the driving waveform signal Pa, three or more pieces of data Ak are required.

When the synchronizing signal S2*b* is selected based on the second selection information and the n-th switch 54(*n*) is selected based on the first selection information, the switch group 54 closes the n-th switch 54(*n*) during a period where the pulse of the synchronizing signal S2*b* is in the high-level state, and opens the n-th switch 54(*n*) during a period where the pulse of the synchronizing signal S2*b* is in the low-level state. Electrical charge applied to the individual electrode 85 when the n-th switch 54(*n*) is closed is held by the first condenser 89*a* and the second condenser 89*b*, and the driving waveform B1 is input to the actuator 88 as shown in FIG. 7B. In other words, in accordance with the particular sampling frequency, the driving waveform signal Pb is separated from the time-division multiplexed signal, and the actuator 88 is driven by the driving waveform signal Pb. It is noted that, in order to represent a change (i.e., concavity and convexity) of the driving waveform signal Pb, three or more pieces of data Bk are required.

When the synchronizing signal S2*c* is selected based on the second selection information and the n-th switch 54(*n*) is selected based on the first selection information, the switch group 54 closes the n-th switch 54(*n*) during a period where the pulse of the synchronizing signal S2*c* is in the high-level state, and opens the n-th switch 54(*n*) during a period where the pulse of the synchronizing signal S2*c* is in the low-level state. Electrical charge applied to the individual electrode 85 when the n-th switch 54(*n*) is closed is held by the first condenser 89*a* and the second condenser 89*b*, and the driving waveform C1 is input to the actuator 88 as shown in FIG. 7C. In other words, in accordance with the particular sampling frequency, the driving waveform signal Pc is separated from the time-division multiplexed signal, and the actuator 88 is driven by the driving waveform signal Pc. It is noted that, in order to represent a change (i.e., concavity and convexity) of the driving waveform signal Pc, three or more pieces of data Ck are required.

The particular sampling frequency is higher than a resonance frequency of the inkjet head 8. The resonance frequency of the inkjet head 8 is a resonance frequency when the pressure chamber 81 is not filled with liquid (ink), or a resonance frequency when the pressure chamber 81 is filled with the liquid (ink). When, for example, the resonance frequency when the pressure chamber 81 is not filled with the ink is 100 kHz, the resonance frequency when the pressure chamber 81 is filled with the ink is less than 100 kHz. Concretely, for example, the resonance frequency when the pressure chamber 81 is filled with the ink is 90 kHz. In other words, the resonance frequency of the inkjet head 8 when the pressure chamber 81 is not filled with the ink is greater than the same when the pressure chamber 81 is filled with the ink.

As described above, the driving waveform signal Pa, Pb or Pc is separated from the time-division multiplexed signal in accordance with the particular sampling frequency. Concretely, the driving waveform signal Pa, Pb or Pc is separated from the time-division multiplexed signal with a time length less than or equal to an inverse of the resonance frequency of the inkjet head 8. it is noted that the time length of each of the driving waveform signals Pa(n) (n=1, 2, . . . ) is less than or equal to the inverse of the resonance frequency of the inkjet head 8, the time length of each of the driving waveform signals Pb(n) (n=1, 2, . . . ) is less than or equal to the inverse of the resonance frequency of the inkjet head 8, and the time length of each of the driving waveform signals Pc(n) (n=1, 2, . . . ) is less than or equal to the inverse of the resonance frequency of the inkjet head 8.

In the printing device 1, a printing method and a non-transitory computer-readable medium according to the present embodiment, the time-division multiplexed signal is generated based on the waveform data Da, Db and Dc which represent the waveforms A, B and C, respectively. From the generated time-division multiplexed signal, the driving waveform signal Pa indicating the driving waveform A, the driving waveform signal Pb indicating the driving waveform B, and the driving waveform signal Pc indicating the driving waveform C are separated. The actuator 88 is driven by the driving waveform signal Pa, Pb or Pc. That is, by selecting the driving waveform signal Pa, Pb or Pc, the amplitude of the driving waveform applied to the actuator 88 can be adjusted. Within a single period for printing one pixel, a cycle of only one of the selected driving waveforms A, B and C, while cycles of the unselected driving waveforms are not included. Therefore, a standby time of the nozzles 80 can be reduced.

Since pulses of the synchronizing signals S2a, S2b and S2c are generated in the first periods Ta1, Tb1 and Tc1, and pulses of synchronizing signals are not generated in the second periods Ta2, Tb2 and Tc2, power consumption and noise can be reduced.

In the above-described embodiment, one driving waveform constitutes one wave in one cycle of printing one pixel, but the configuration may be modified such that one driving waveform may constitute multiple waves. For example, in the driving waveform signal Pb, signals Pb(2) to Pb(4) and Pb(6) to Pb(8) may be the first signals, and signals Pb(1) and Pb(9) may be the second signals. In such a case, the driving waveform B1 constitutes two waves, i.e., one wave based on the signals Pb(2) to Pb(4) and the other wave based on the signals Pb(6) to Pb(8).

First Modified Embodiment

Hereinafter, the printing device 1 according to a first modified embodiment will be described with reference to drawings. Among the configurations of the printing device 1 according to the first modified embodiment, the symbols same as those of the above-describe embodiment are assigned with the same reference numbers/symbols and detailed descriptions thereof are omitted.

Figure 8:
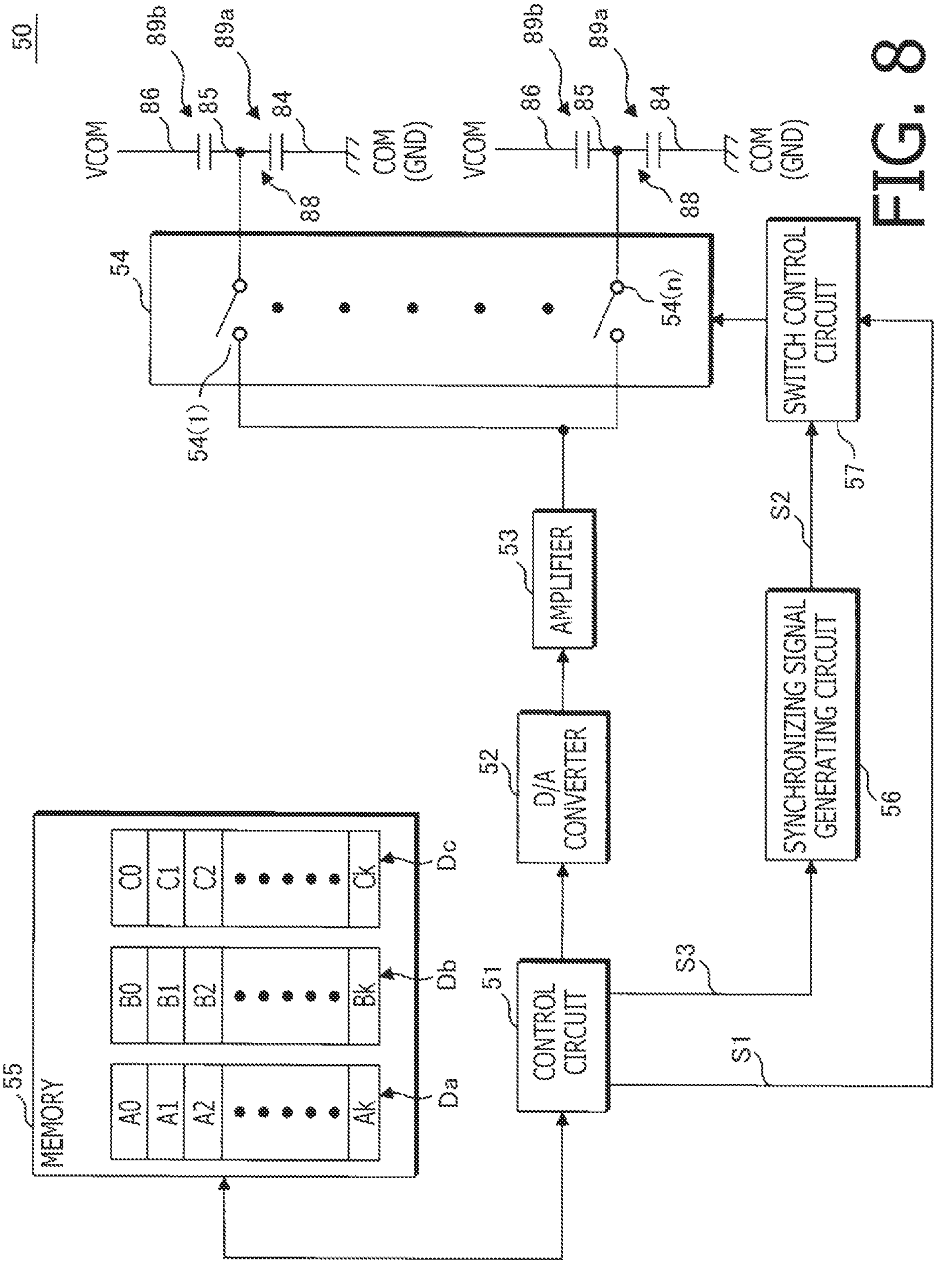
FIG. 8 is a block diagram of a controller.
Figure 10A:
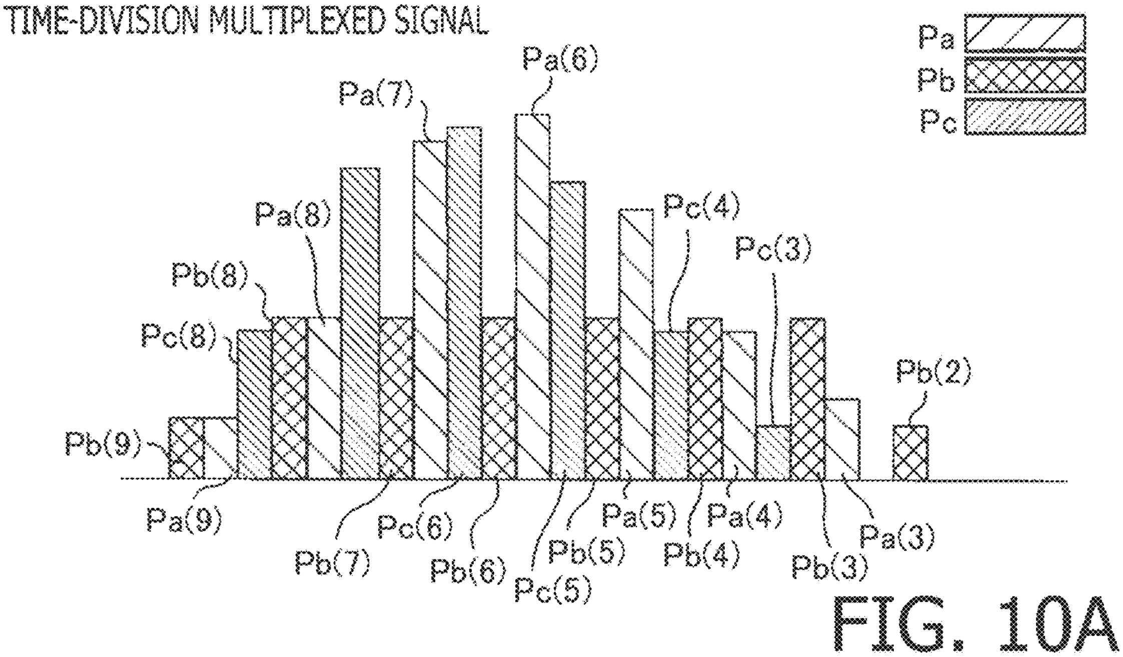
FIGS. 10A, 10B, 10C and 10D illustrate a relationship among the time-division multiplexed signal and synchronizing signals according to a second modified embodiment.
Figure 10B:
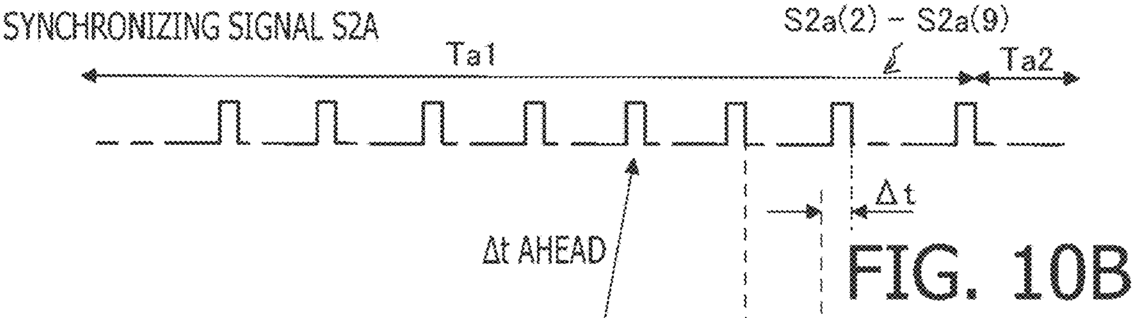
Figure 10C:
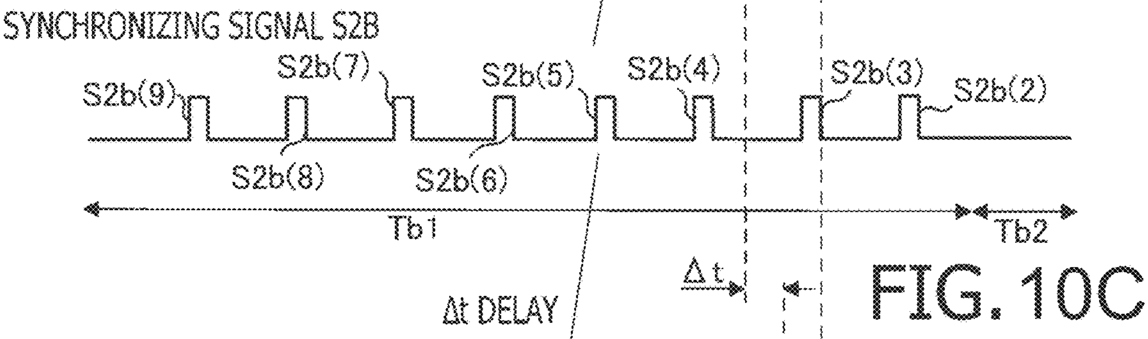
Figure 10D:
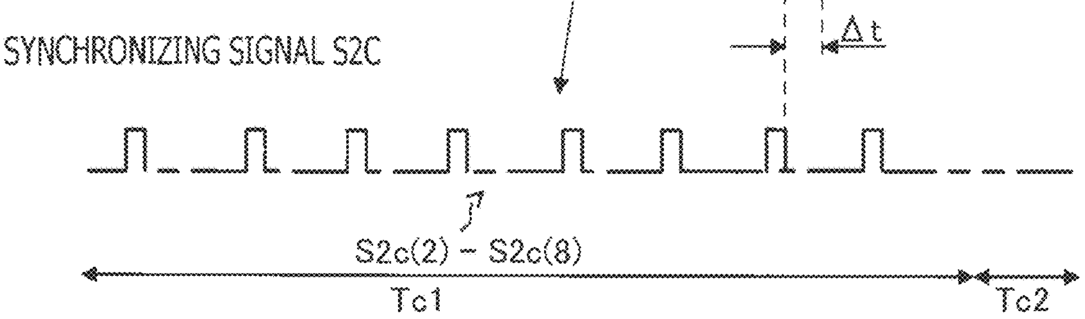

FIG. 8 is a block diagram of the controller 50 according to the first modified embodiment. Unlike the above-described embodiment, in the first modified embodiment, the controller 50 includes a synchronizing signal generating circuit 56 and a switch control circuit 57. The control circuit 51 includes a counter. The synchronizing signal generating circuit 56 includes a counter that is synchronized with the counter of the control circuit 51. The control circuit 51 outputs switch control signals S1 that control the opening and closing of the plurality of n-th switches 54(*n*) to the switch control circuit 57. Further, the control circuit 51 outputs, to the synchronizing signal generating circuit 56, a generation instruction signal S3 that instructs the generation of the synchronizing signal S2a corresponding to a driving waveform A, a synchronizing signal S2b corresponding to a driving waveform B, and a synchronizing signal S2c corresponding to a driving waveform C. The three synchronizing signals S2a, S2b and S2c will also be denoted simply as a synchronizing signal S2. The synchronizing signal generating circuit 56 generates the synchronizing signal S2 and outputs the same to the switch control circuit 57.

The switch control circuit 57 has a counter synchronized with a counter of the control circuit 51, and associates the switch control signal S1 with the synchronizing signal S2 based on the counter, and outputs the same to the n-th switch 54(*n*). The switch control signal S1 includes first selection information indicating selection of one of the multiple n-th switches 54(*n*) and second selection information indicating selection of one of the three synchronizing signals S2a, S2b and S2c. The first selection information and the second selection information are associated with each other. The switch group 54, the synchronizing signal generating circuit 56, and the switch control circuit 57 constitute a separation section.

FIGS. 9A-9D illustrate the relationship between the time-division multiplexed signals and the synchronizing signals S2a, S2b and S2c. The driving waveform signal Pa includes signals Pa(1) to Pa(9) aligned in time series. Signals Pa(3) through Pa(9) are first signals of which the amplitude of the voltage is greater than or equal to a particular value. The signals Pa(1) and Pa(2) are second signals of which the amplitude of the voltage is less than a particular value. In FIG. 9A, only the signals Pa(3) through Pa(9), which are the first signals, are illustrated. A period during which the signals Pa(3) through Pa(9) are present constitutes a first period Ta1, and a period during which the signals Pa(1) and Pa(2) are present constitutes a second period Ta2 (see FIG. 9B).

The driving waveform signal Pb includes signals Pb(1) to Pb(9) aligned in time series. The signals Pb(2) to Pb(9) are the first signals. The signal Pb(1) is the second signal. Only the first signals, i.e., the signals Pb(2) through Pb(9), are shown in FIG. 9A. A period during which the signals Pb(2) to Pb(9) are present constitutes the first period Tb1, and a period during which the signal Pb(1) is present constitutes the second period Tb2 (see FIG. 9C).

The driving waveform signal Pc includes signals Pc(1) to Pc(9) aligned in time series. The signals Pc(3) through Pc(8) are the first signals. The signals Pc(1), Pc(2), and Pc(9) are the second signals. Only the first signals, i.e., the signals Pc(3) through Pc(8), are shown in FIG. 9A. A period during which the signals Pc(3) to Pc(8) are present constitutes the first period Tc1, and a period during which the signals Pc(1), Pc(2), and Pc(9) are present constitutes the second period Tc2 (see FIG. 9D).

The control circuit 51 compares the signals Pa(1) to Pa(9), Pb(1) to Pb(9), and Pc(1) to Pc(9) to select the driving waveform signal of which the first period is the longest. In the present embodiment, since the first period Tb1 is the longest among the three first periods Ta1, Tb1 and Tc1, the control circuit 51 selects the driving waveform signal Pb. The control circuit 51 generates the synchronizing signal S2*b* such that pulses are present during the first period Tb1 and no pulses are present during the second period Tb2. In other words, the control circuit 51 generates the synchronizing signal S2*b* such that pulses S2*b*(2) to S2*b*(9) corresponding to signals Pb(2) to Pb(9) are present and no pulses corresponding to signal Pb(1) are present. It is noted that the signals Pb(2) to Pb(9) correspond to counter values 2 to 9, respectively, and the pulses S2*b*(2) to S2*b*(9) correspond to counter values 2 to 9, respectively. The control circuit 51 outputs the generated synchronizing signal S2*b* to the synchronizing signal generating circuit 56. The synchronizing signal S2*b* is an example of a reference signal and a longest synchronizing signal.

The control circuit 51 outputs the counter value of the first signal in the driving waveform signal Pa to the synchronizing signal generating circuit 56. For example, the first signals in the driving waveform signal Pa are signals Pa(3) through Pa(9), and the counter values for the first signals are 3 through 9.

The control circuit 51 outputs the counter value of the first signal in the driving waveform signal Pc to the synchronizing signal generating circuit 56. For example, the first signals in the driving waveform signal Pc are signals Pc(3) to Pc(8), and the counter values of the first signals are 3 to 8. The aforementioned generation instruction signal S3 includes the synchronizing signal S2*b*, the counter value of the first signal in the driving waveform signal Pa, and the counter value of the first signal in the driving waveform signal Pc.

The synchronizing signal generating circuit 56 outputs the synchronizing signal S2*b* to the switch control circuit 57. The synchronizing signal S2*b* is a synchronizing signal corresponding to the driving waveform signal Pb. The synchronizing signal generating circuit 56 generates the synchronizing signal S2*a* based on the synchronizing signal S2*b* and the counter values 3 to 9. As shown in FIG. 9C, the synchronizing signal generating circuit 56 removes pulses other than those corresponding to counter values 3 to 9 from the synchronizing signal S2*b*, that is, the synchronizing signal generating circuit 56 removes the pulse S2*b*(2) from the synchronizing signal S2*b*. The synchronizing signal generating circuit 56 generates the synchronizing signal S2*a* by bringing forward the entire synchronizing signal S2*b* by Δt after removing the pulse S2*b*(2). The synchronizing signal S2*a* contains the pulses S2*a*(3) to S2*a*(9). In other words, the synchronizing signal generating circuit 56 uses a part of the synchronizing signal S2*b* to generate the synchronizing signal S2*a*.

The synchronizing signal generating circuit 56 generates the synchronizing signal S2*c* based on the synchronizing signal S2*b* and the counter values 3 to 8. As shown in FIGS. 9B-9D, the synchronizing signal generating circuit 56 removes pulses other than pulses corresponding to counter values 3 to 8 from the synchronizing signal S2*b*, that is, the synchronizing signal generating circuit 56 removes the pulses S2*b*(2) and S2*b*(9). The synchronizing signal generating circuit 56 generates the synchronizing signal S2*c* by delaying the entire synchronizing signal S2*b* with the pulse S2*b*(2) removed by Δt. The synchronizing signal S2*c* includes the pulses S2*c*(3) to S2*c*(8). That is, the synchronizing signal generating circuit 56 uses a part of the synchronizing signal S2*b* to generate the synchronizing signal S2*c*.

That is, the synchronizing signal generating circuit 56 generates the synchronizing signals S2*a*, S2*b* and S2*c* in such a manner that the synchronizing signals are in the first state in which the first signal can be separated during the first period in which at least the first signal is present, and the synchronizing signals are in the second state in which the first signal is not separable, different from the first state during at least a part of the second period in which the second signal is present.

Since the synchronizing signal generating circuit 56 generates the synchronizing signals S2*a* and S2*c* based on the synchronizing signal S2*b* output from the control circuit 51, even if there is a gap in the reference frequency between the control circuit 51 and the synchronizing signal generating circuit 56, the gap can be corrected with reference to the synchronizing signal S2*b*.

The switch group 54 opens and closes the n-th switch 54(*n*) selected based on the first selection information at open/close timings indicated by the synchronizing signals S2*a* to S2*c* selected based on the second selection information. In other words, the switch group 54 opens and closes the n-th switch 54(*n*) at a particular sampling frequency.

When one driving waveform forms multiple waves in one cycle of printing one pixel, the longest of the first periods corresponding to respective waves may be used for the comparison. For example, when signals Pb(2) to Pb(4) and Pb(6) to Pb(9) constitute the first signal and signals Pb(1) and Pb(5) constitute the second signal in the driving waveform signal Pb, that is, when the driving waveform B forms two waves, a first period corresponding to the signals Pb(6) to Pb(9), the first period Ta1 and the first period Tc1 may be compared. When the synchronizing signal S2*a* is the reference signal and the longest synchronizing signal, the synchronizing signal generating circuit 56 generates the synchronizing signal S2*b* based on the synchronizing signal S2*a*, counter values 2 to 4, and counter values 6 to 9. The entire synchronizing signal S2*a* is shifted forward by 2Δt to remove pulses other than the counter values 3 to 5 of the synchronizing signal S2*a*, and a part of the synchronizing signal S2*b* corresponding to the signals Pb(2) to Pb(4) is generated. Further, the entire synchronizing signal S2*a* is delayed by Δt to remove pulses other than the counter values 6 to 9 of the synchronizing signal S2*a*, and a part of the synchronizing signal S2*b* corresponding to the signals Pb(6) to Pb(9) is generated.

Second Modified Embodiment

Hereinafter, a second modified embodiment according to the present disclosure will be described with reference to the drawings. In the second modified embodiment, the time-division multiplexing signals Pa, Pb, and Pc and the synchronizing signal S2*b* are the same as in the first modified embodiment, while the synchronizing signals S2*a* and S2*c* are different from the synchronizing signals S2*a* and S2*c* in the first modified embodiment. In the following description of the second modified embodiment, details of configurations different from those in the first modified embodiment will be described in detail, while configurations similar to those in the first modified embodiment will be omitted as appropriate.

FIGS. 10A-10D illustrate a relationship between a time-division multiplexed signal and the synchronizing signals S2*a*, S2*b* and S2*c*. The control circuit 51 selects a driving waveform signal with the longest first period, i.e., the driving waveform signal Pb. The control circuit 51 generates the synchronizing signal S2*b* such that there is a pulse during the first period Tb1 but no pulse during the second period Tb2. In other words, the control circuit 51 generates the synchronizing signal S2*b* such that there are pulses S2*b*(2) to S2*b*(9) corresponding to the signals Pb(2) to Pb(9) but no pulse corresponding to the signal Pb(1). The control circuit 51 outputs the synchronizing signal S2*b* to the synchronizing signal generating circuit 56. The aforementioned generation instruction signal S3 includes the synchronizing signal S2*b*. The synchronizing signal S2*b* is an example of the reference signal and the longest synchronizing signal.

The synchronizing signal generating circuit 56 outputs the synchronizing signal S2*b* to the switch control circuit 57. The synchronizing signal S2*b* is a synchronizing signal corresponding to the driving waveform signal Pb. The synchronizing signal generating circuit 56 generates the synchronizing signal S2*a* by putting the entire synchronizing signal ahead S2*b* by Δt. Further, the synchronizing signal generating circuit 56 delays the entire synchronizing signal S2*b* by Δt to generate the synchronizing signal S2*c*.

That is, the synchronizing signal generating circuit 56 generates the synchronizing signals S2*a*, S2*b* and S2*c* in such a manner that the synchronizing signals S2*a*, S2*b* and S2*c* are in a first state in which a first signal can be separated within a first period during which at least the first signal is present, and the synchronizing signals S2*a*, S2*b* and S2*c* are in a second state in which the first signal cannot be separated within at least a part of a second period during which the second signal is present, the first period being different from the second period.

Modifications

In first and second modified embodiments, the control circuit 51 outputs the synchronizing signal S2*b* to the synchronizing signal generating circuit 56, and the synchronizing signal generating circuit 56 generates the synchronizing signals S2*a* and S2*c* based on the synchronizing signal S2*b*. However, the control circuit 51 does not need to output the synchronizing signal S2*b* to the synchronizing signal generating circuit 56.

For example, a clock generating circuit may be provided to the synchronizing signal generating circuit 56, and the control circuit 51 may output to, the synchronizing signal generating circuit 56, information indicating a starting point of each of the synchronizing signals S2*a*, S2*b* and S2*c*, a counter value of the first signal in the driving waveform signal Pa, a counter value of the first signal in the driving waveform signal Pb, and a counter value of the first signal in the driving waveform.

The synchronizing signal generating circuit 56 may generate periodic reference signals with a clock generating circuit and generate synchronizing signals S2*a*, S2*b* and S2*c* based on the generated periodic reference signals, information indicating the starting points of the synchronizing signals S2*a*, S2*b* and S2*c*, respectively, the counter value of the first signal in the driving waveform signal Pa, the counter value of the first signal in the driving waveform signal Pb, the counter value of the first signal in the driving waveform signal Pc, and the counter value of the first signal in the driving waveform signal Pc.

For example, the starting point of the synchronizing signal S2*a* is a point in time shifted forward by Δt from the starting point of the synchronizing signal S2*b*, and the starting point of the synchronizing signal S2*c* is a point in time delayed by Δt from the starting point of the synchronizing signal S2*b*. For example, as shown in FIGS. 9A-9D, the counter values of the first signal in the driving waveform signal Pa are from 3 to 9, the counter values of the first signal in the driving waveform signal Pb are from 2 to 9, and the counter values of the first signal in the driving waveform signal Pc are from 3 to 8.

The embodiments disclosed here should be considered in all respects illustrative and not restrictive. Aspects of the present disclosure are intended to include all modifications within the scope of the claims and the scope equivalent to the claims. The matters described in the respective embodiments can be combined with each other. Further, the independent and dependent claims set forth in the claims may be combined with each other in all combinations, regardless of the form of citation.

What is claimed is:

1. A printing device, comprising:

an energy generating element;

a multiplexing part configured to generate a time-division multiplexed signal based on first data indicating a first driving waveform and second data indicating a second driving waveform different from the first driving waveform, the first data and the second data being transmittable via the time-division multiplexed signal through a single signal line, the time-division multiplexed signal including a first part of the first driving waveform, a second part of the first driving waveform, a third part of the second driving waveform and a fourth part of the second driving waveform, the third part being arranged between the first part and the second part, the second part being arranged between the third part and the fourth part; and a separator configured to separate, based on a synchronizing signal, one of a first driving waveform signal indicating the first driving waveform and a second driving waveform signal indicating the second driving waveform from the time-division multiplexed signal input to the separator, wherein the first driving waveform signal includes a first signal and a second signal, an amplitude of the first signal being greater than or equal to a particular value, an amplitude of the second signal being less than the particular value, and wherein the printing device is configured to:

generate the synchronizing signal in such a manner that the synchronizing signal is in a first state during a first period when the first signal is present, and is in a second state different from the first state during at least part of a second period when the second signal is present, the first signal being separable when the synchronizing signal is in the first state, the first signal being not separable when the synchronizing signal is in the second state; and drive the energy generating element based on one of the first driving waveform signal and the second driving waveform signal, whereby liquid is ejected through a nozzle, wherein the multiplexing part includes a control circuit, wherein the control circuit is configured to output a reference signal to the separator used for generating the synchronizing signal, wherein the separator includes a generating circuit configured to generate the synchronizing signal based on the reference signal, and wherein the reference signal is a longest synchronizing signal corresponding to a driving waveform signal, the first period of the reference signal being longest among driving waveform signals.

2. The printing device according to claim 1,
wherein the multiplexing part includes a control circuit, and
wherein the control circuit is configured to generate the synchronizing signal based on a start point and an end point of the first signal.

3. The printing device according to claim 1,
wherein the generating circuit is configured to generate a synchronizing signal other than the longest synchronizing signal by putting ahead or delaying entire of the longest synchronizing signal.

4. The printing device according to claim 1,
wherein the generating circuit is configured to generate a synchronizing signal other than the longest synchronizing signal by using a part of the longest synchronizing signal.

5. The printing device according to claim 1,
wherein the multiplexing part includes a control circuit, and
wherein the control circuit is configured to output, to the separator, information used to generate the synchronizing signal based on a start point and an end point of the first signal, and
wherein the separator includes a generating circuit configured to generate the synchronizing signal based on the information received from the control circuit.

6. A printing device, comprising:
a head including an energy generating element;
a multiplexing part configured to generate a time-division multiplexed signal based on first data indicating a first driving waveform and second data indicating a second driving waveform different from the first driving waveform, the first data and the second data being transmittable via the time-division multiplexed signal through a single signal line, the time-division multiplexed signal including a first part of the first driving waveform, a second part of the first driving waveform, a third part of the second driving waveform and a fourth part of the second driving waveform, the third part being arranged between the first part and the second part, the second part being arranged between the third part and the fourth part; and
a separator configured to separate, based on a synchronizing signal, one of a first driving waveform signal indicating the first driving waveform and a second driving waveform signal indicating the second driving waveform from the time-division multiplexed signal input to the separator,
wherein the first driving waveform signal includes a first signal and a second signal, an amplitude of the first signal being greater than or equal to a particular value, an amplitude of the second signal being less than the particular value, and
wherein the printing device is configured to:
generate the synchronizing signal in such a manner that the synchronizing signal is in a first state during a first period when the first signal is present, and is in a second state different from the first state during at least part of a second period when the second signal is present, the first signal being separable when the synchronizing signal is in the first state, the first signal being not separable when the synchronizing signal is in the second state;
drive the energy generating element based on one of the first driving waveform signal and the second driving waveform signal, whereby liquid is ejected through a nozzle, and
wherein the separator is configured to separate one of the first driving waveform signal and the second driving waveform signal from the time-division multiplexed signal with a time length less than or equal to an inverse of a resonance frequency of the head.

7. The printing device according to claim 6,
wherein the resonance frequency of the head is a resonance frequency of the head when the head is filled with liquid.

8. A printing device, comprising:
a head including an energy generating element;
a multiplexing part configured to generate a time-division multiplexed signal based on first data indicating a first driving waveform and second data indicating a second driving waveform different from the first driving waveform, the first data and the second data being transmittable via the time-division multiplexed signal through a single signal line, the time-division multiplexed signal including a first part of the first driving waveform, a second part of the first driving waveform, a third part of the second driving waveform and a fourth part of the second driving waveform, the third part being arranged between the first part and the second part, the second part being arranged between the third part and the fourth part; and
a separator configured to separate, based on a synchronizing signal, one of a first driving waveform signal indicating the first driving waveform and a second driving waveform signal indicating the second driving waveform from the time-division multiplexed signal input to the separator,
wherein the first driving waveform signal includes a first signal and a second signal, an amplitude of the first signal being greater than or equal to a particular value, an amplitude of the second signal being less than the particular value, and
wherein the printing device is configured to:
generate the synchronizing signal in such a manner that the synchronizing signal is in a first state during a first period when the first signal is present, and is in a second state different from the first state during at least part of a second period when the second signal is present, the first signal being separable when the synchronizing signal is in the first state, the first signal being not separable when the synchronizing signal is in the second state;
drive the energy generating element based on one of the first driving waveform signal and the second driving waveform signal, whereby liquid is ejected through a nozzle, and
wherein a time length of the first part is an inverse of a resonance frequency of the head.

9. The printing device according to claim 8,
wherein the time length of the first part is less than or equal to an inverse of a resonance frequency of the head when the head is filled with liquid.

* * * * *